Sept. 24, 1957 E. H. GATZERT 2,807,667

TELEPHONE TRUNK CIRCUIT

Filed June 11, 1954 4 Sheets-Sheet 1

Sept. 24, 1957 E. H. GATZERT 2,807,667

TELEPHONE TRUNK CIRCUIT

Filed June 11, 1954 4 Sheets-Sheet 2

TELEPHONE TRUNK CIRCUIT

Filed June 11, 1954 4 Sheets-Sheet 4

United States Patent Office
2,807,667
Patented Sept. 24, 1957

2,807,667

TELEPHONE TRUNK CIRCUIT

Ernest H. Gatzert, Rochester, N. Y., assignor, by mesne assignments, to General Dynamics Corporation, a corporation of Delaware Application June 11, 1954, Serial No. 436,109

5 Claims. (Cl. 179—7.1)

This invention relates to telephone systems and more particularly to a trunking circuit for use between dial offices in a telephone system.

In previous circuits of this character, provision for the conversation timing means has been accomplished by the use of additional relays while, in the present invention, existing relays have been reused to perform the same conversation timing purpose.

It is an object of my invention to provide a new and improved trunk circuit for telephone systems.

Still another object of my invention is the provision of new and improved conversation timing means in telephone trunk circuits.

A further object of my invention is to provide a trunk circuit in which certain relays are reused for conversation timing purposes.

The novel features believed to be characteristic of this invention are set forth in the appended claims. The invention, both as to its organization and method of operation, together with further objects and advantages thereof will best be understood by the consideration of the following specification, taken in connection wtih the accompanying drawings in which Figs. 1 to 3, inclusive, taken together and arranged in numerical order with correspondingly numbered lines in alignment, illustrate a circuit arrangement having embodied therein the features of the invention briefly outlined above, and Fig. 4 comprises a block diagram of a telephone system including the trunk circuit of Figs. 1 to 3.

Figure 1:
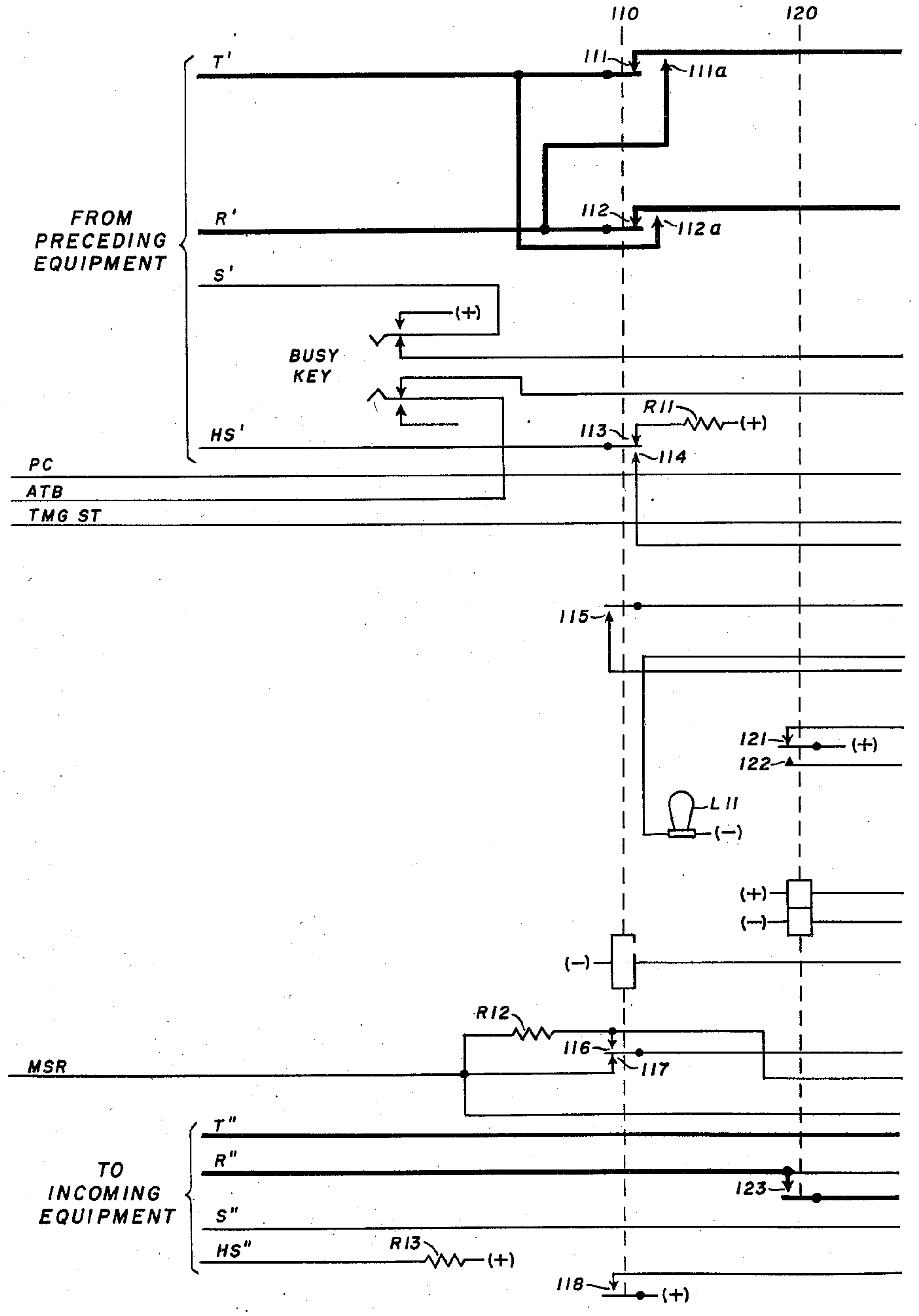
Figure 2:
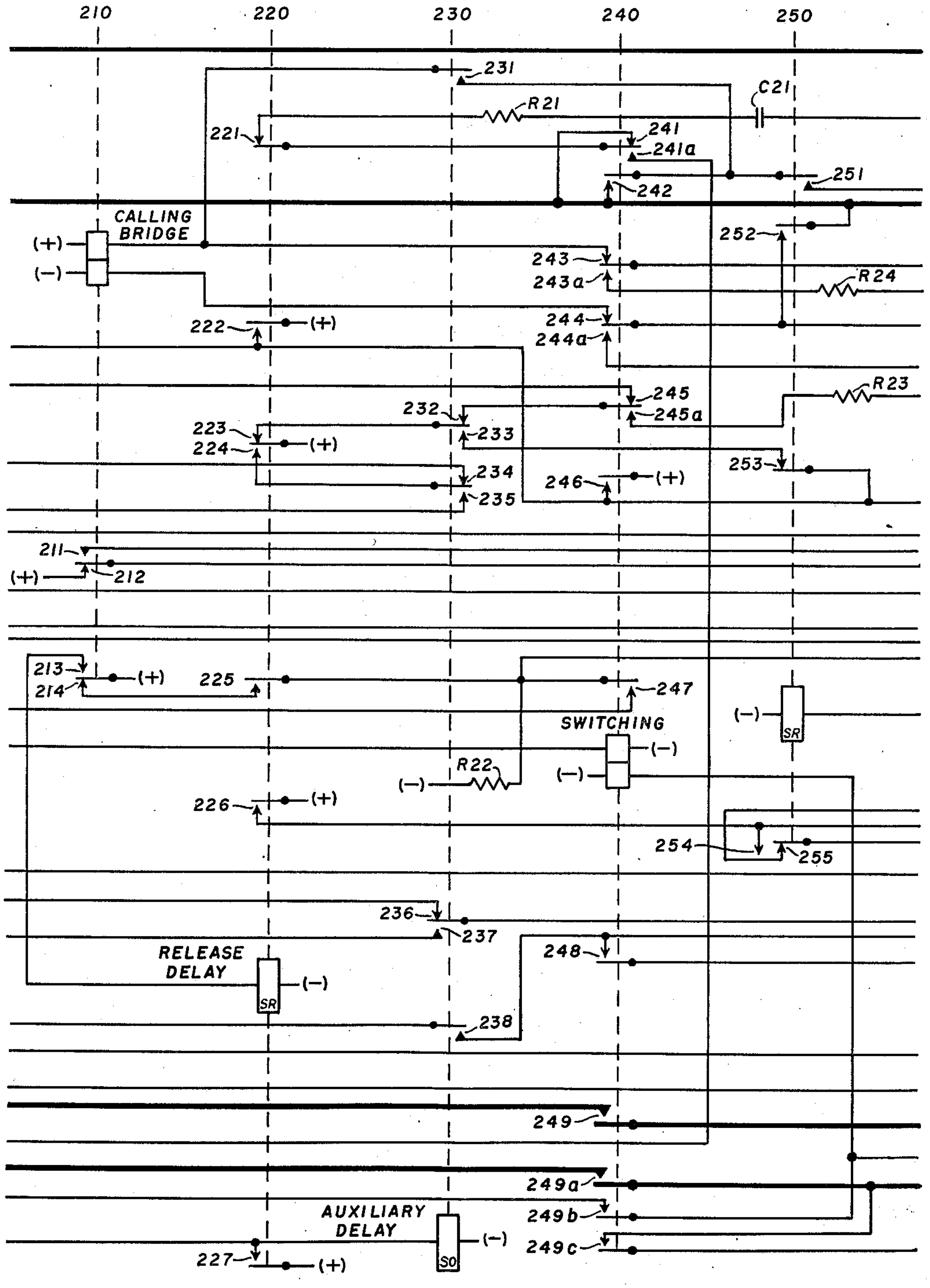
Figure 3:
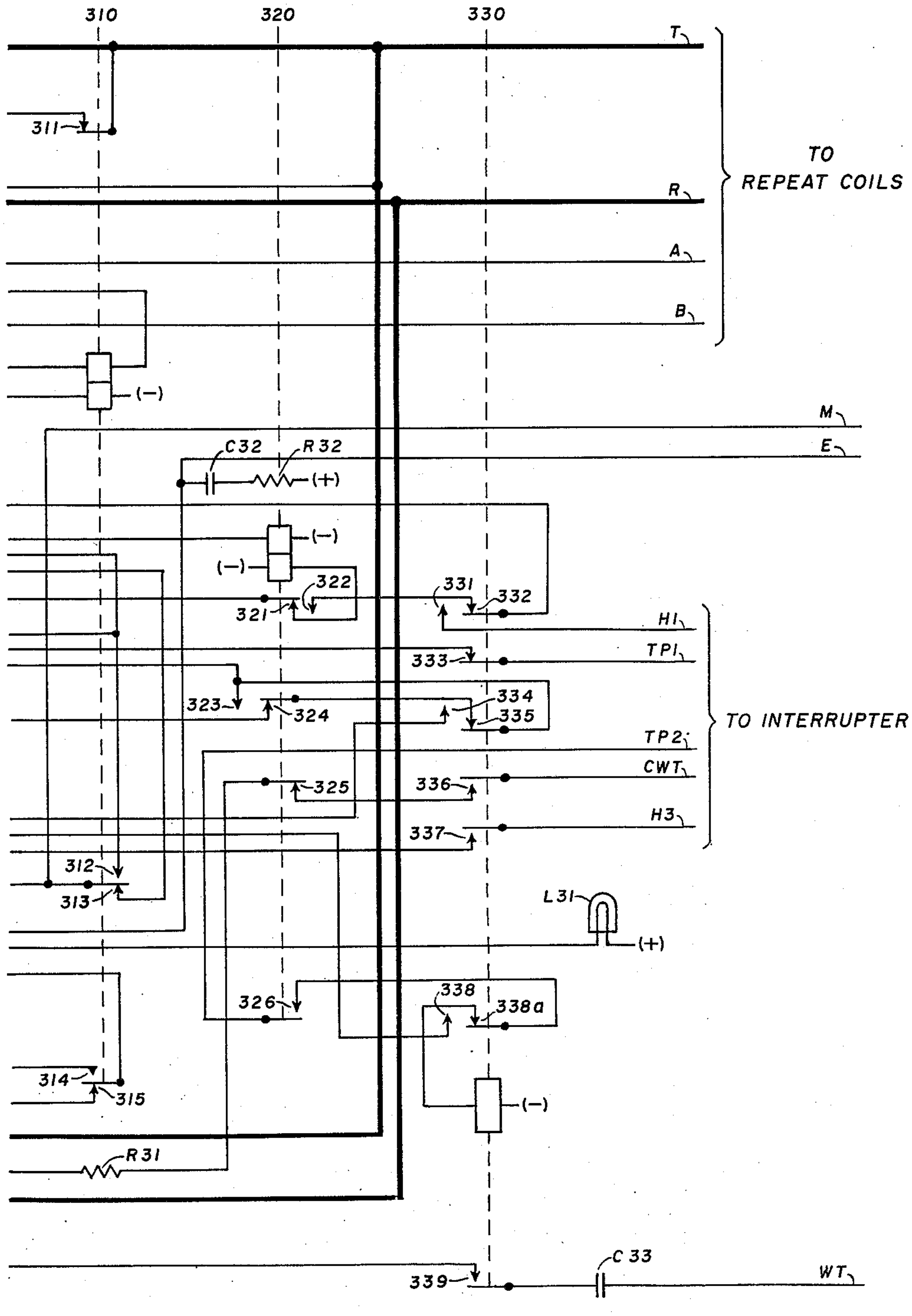
Figure 4:
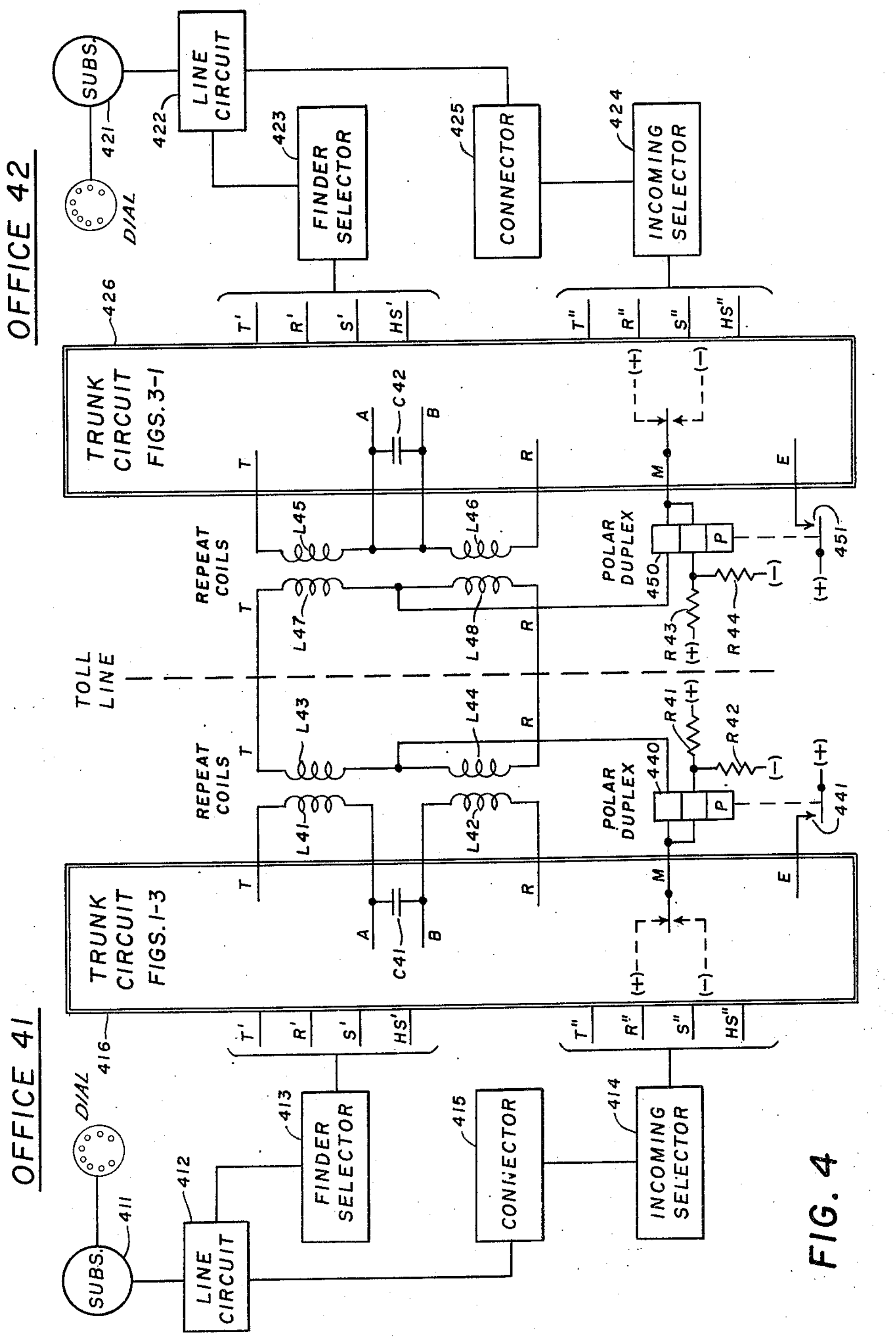

In Fig. 4 there is shown the equipment used in a typical call, starting with a subscriber 411 in office 41 initiating a call, using line circuit 412 and finder selector 413 to reach the trunk circuit 416, Figs. 1–3. Seizure of the apparatus in office 41 is utilized to energize the incoming selector 424 in office 42, and the subsequent dialing procedure, by means of the toll line T and R, energizes the connector 425 which subsequently selects the line circuit 422 and subscriber 421. A call in the reverse direction from a subscriber 421 in office 42 is progressively connected through line circuit 422, finder selector 423, trunk circuit 426 (Figs. 3 to 1 in that order), toll line conductors T and R and trunk circuit 416 (Figs. 1 to 3), to the incoming selector 414, and the subsequent dialing procedure selects the line circuit 412 and subscriber 411 by stepping incoming selector 414 and connector 415 in the well known manner. The repeating coils at each end of the toll line have their windings L43, L44, L47 and L48 connected in the well known manner for simplex operation although composite operation may be provided if desired. The negative side of the common exchange battery is indicated by (−), and the positive side of the exchange battery which is usually connected to ground, is indicated by (+).

*Outgoing call.*—On an outgoing call, preceding equipment (such as finder-selector 413) energizes calling bridge relay 210, by closing a loop circuit across incoming conductors T′ and R′, from ground through the upper winding of relay 210, normally closed contacts 243, winding L41 between conductors A and T, normally closed contacts 111, calling loop circuit across incoming conductors T′ and R′, normally closed contacts 112, winding L42 between conductors R and B, normally closed contacts 244, and lower winding of relay 210 to battery.

In response to the operation of relay 210, first release delay relay 220 is energized from ground through operated contacts 213, and the winding of relay 220 to battery. Relay 220 has a slow-release characteristic which causes it to remain operated while relay 210 is responding to the subsequent pulsing procedure.

Relay 210, when operated, also removes ground from conductor M at normally closed contacts 212 and connects battery through lamp L11, operated contacts 211, and normally closed contacts 313, to the conductor M of the outgoing signaling circuit to energize the similar trunk circuit at the terminating office. Ground is normally connected to the lead M, to stabilize the pulses on lead M. Battery on lead M energizes the polar duplex relay 450 to close contacts 451 to seize incoming selector 424 for subsequent selection of subscriber 421. Battery on lead M from trunk circuit 426, Figs. 3–1, energizes polar duplex relay 440 to close contacts 441 for subsequent selection of subscriber 411. The polar duplex relays 440 and 450 each have a resistor network for correct operation, indicated by resistors R41 and R42 for relay 440 and resistors R43 and R44 for relay 450.

Operation of relay 210 during the subsequent pulsing procedure correspondingly operates a previously described relay (not shown) connected to the lead E in the distant office, to signal the called party.

Relay 250 is also operated during the pulsing of relay 210 over a circuit extending from battery through the winding of second slow-to-release relay 250, normally closed contacts 324 and 335, operated contacts 225, and normally closed contacts 214 to ground, and remains operated during pulsing due to its slow release characteristic but releases a predetermined time after the end of the last digit due to the breaking of its energizing circuit at contact 214.

Operation of relay 250 shorts the windings of the repeating coils L41 in the SX equipment of Fig. 4, by way of operated contacts 251, 231 and normal contacts 243 and coil L42 by way of operated contacts 252 to improve pulsing conditions.

Operation of relay 220 connects ground, through operated contacts 222 and normally closed contacts of the busy key, to the incoming sleeve conductor S′, to guard this equipment from other calls. Operation of relay 220 also opens the normally closed terminating circuit comprising capacitor C21 and resistor R21 at contacts 221.

Operation of relay 220 also energizes slow-to-operate auxiliary delay relay 230 from ground through operated contacts 227 and the winding of relay 230 to battery. The pegcount lead PC is momentarily (while relay 230 is slowly operating) connected to ground through operated contacts 224, and normally closed contacts 234.

In response to the complete operation of relay 230, ground is connected through operated contacts 224 and 235, to the lead TMG ST to start the timing equipment. Operation of relays 220 and 230 also removes ground, at contacts 223 and 232, from common lead ATB. Ground is also disconnected from lead ATB when switching relay 240 opens contacts 245 at a later time and when the busy key is operated.

Operation of relay 230 also connects relay 110 to the outgoing lead E, through operated contacts 237 and the winding of relay 110 to battery. Operation of auxiliary delay relay 230 also lights lamp L31 from ground through lamp L31, operated contacts 238, and normally closed contacts 117 to battery on lead MSR. Capacitor C32 and resistor R32 are used to reduce the spark effect on the contacts as they break during the release of relays 110 or 120. In response to answer at the called station, lead E is grounded in conventional manner so that relay 110 operates over the above-described circuit and the incoming conductors T' and R' are reversed by the transfer of contacts 111 and 111*a*, and contacts 112 and 112*a*, respectively, to signal the calling party in the well known manner.

Operation of relay 110 also connects a multiple holding ground through operated contacts 118 to relay 230 to hold it operated until the called party disconnects. Operation of relay 110 also partially extinguishes the lamp L31 by opening the previously described direct ground connection through contacts 117, and closing contacts 116 so that lamp L31 is dimly lit through resistor R12.

Operation of relay 110 also transfers lead HS' from ground through resistor R11 and normally closed contacts 113 to battery through the upper resistance winding of relay 320 and operated contacts 114, to the incoming conductor HS' to indicate an answering condition by the called party.

*Conversation timing.*—Operation of relay 110 also connects lead TP1 through normally closed contacts 333, operated contacts 115, normally closed contacts 321, and the lower winding of relay 320 to battery. Operation of relay 320 disconnects lead TP1 at contacts 321 and locks relay 320, through operated contacts 322 and normally closed contacts 332 to ground normally appearing on incoming sleeve conductor S'. Operation of relay 320 also closes contacts 323 so that relay 250 may still be operated from calling bridge relay 210 after the operation of relay 320. The timing of the call has now started and continues for the desired timing period.

Operation of relay 320 also prepares a circuit including the second timing lead TP2 so that when a timing pulse is applied to lead TP2 by the timing equipment, relay 330 operates from the said ground pulse through operated contacts 326, normally closed contacts 338*a*, and the winding of relay 330 to battery. Operation of relay 330 closes its own locking circuit from ground at contacts 226 through operated contacts 338 and the winding of relay 330 to battery. The ground lead TP1 is also opened at contacts 333 when relay 330 operates so that relay 320 cannot be subsequently reoperated by pulses on lead TP1.

As the allotted timing period approaches its finish, ground on lead H1, which has been holding relay 320, through operated contacts 331 and 322 is removed to restore relay 320. With relay 330 operated and relay 320 restored, relay 240 is partially operated by a ground pulse on lead CWT, through operated contacts 336, normally closed contacts 325, and resistor R31 to the lower winding of relay 240. The partial operation of relay 240 applies a warning tone on lead WT through capacitor C33, operated contacts 339 and 249*c* to ring lead R to inform both the calling and called parties that the allotted conversation time is nearing its end.

After the warning tone is removed by the restoration of relay 240, a momentary ground on lead H3 operates relay 250 through operated contacts 337, normally closed contacts 255, operated contacts 334, normally closed contacts 324, and the winding of relay 250 to battery.

Operation of relay 250 closes a locking ground for itself from ground through operated contacts 226, 254 and 334 and normally closed contacts 324 so that it does not restore when the momentary ground is removed from lead H3. Operation of relay 250 also closes contacts 251 and 252 to short out the windings L41 and L42 of the SX equipment so that no further conversation between calling and called parties is possible at this time.

At the completion of the conversation, either with or without the timing out operation as previously described, relay 210 restores when the calling party opens the incoming loop circuit. Relay 220 also restores, after a timing interval, to remove ground, at contacts 222, from the incoming conductor S' to permit subsequent calls to use this equipment. Holding ground for other apparatus used in the call is also removed by the restoration of relays 210 and 220. Restoration of relay 220 also reconnects, through contacts 311, 221 and 241, the idle line termination resistor R21 and capacitor C21 across the toll line equipment.

Means is provided for canceling conversation timing on predetermined calling equipment. Thus, if ground or resistance ground is applied in some suitable fashion (not shown) to incoming lead HS', a circuit is completed from lead HS' through operated contacts 114 and the upper winding of relay 320 to maintain that relay operated. Hence, relay 320 does not release when ground is removed from lead H1 so that relay 240 does not operate to apply warning tone and relay 250 does not reoperate to short out windings L41 and L42.

*Incoming call.*—On a call from a distant office into Fig. 3 of this circuit, ground on lead E of the signaling circuit (see Fig. 4), through normally closed contacts 236, energizes the lower winding of relay 120.

Operation of relay 120 energizes relay 240 from ground through operated contacts 122 and the upper winding of relay 240 to battery. Pulsing to the incoming equipment is done, in the usual manner, by pulsing relay 120, as required. On the first release of relay 120 during pulsing, slow-to-release relay 250 operates from ground through contacts 121, operated contacts 247, normally closed contacts 335 and 324, and the winding of relay 250 to battery for the same purpose described in an outgoing call. Operation of relays 120 and 240 also closes a loop circuit across the incoming equipment, from conductor T'' through operated contacts 249, repeating coil winding 141 between conductors T and A, operated contacts 243*a*, resistor R24, upper winding of relay 310, operated contacts 244*a*, repeating coil winding L42 between conductors B and R, operated contacts 249*a* and 123, to the incoming conductor R''.

Operation of relay 240 also connects ground, at contacts 246, to the incoming selector bank terminal S' to prevent seizure of this equipment by another call. Operation of relay 240, through operated contacts 249*b*, also connects its lower winding to the selector conductor S'' so that relay 240 will remain operated independently of the ground from contacts 122, and also that this trunking circuit will remain guarded against other calls until the terminating equipment used on this call is fully restored. Operation of switching relay 240 also connects line termination capacitor C21 and resistor R21 across conductors T'' and R'' at operated contacts 241*a* until relay 310 operates when the called party answers, to open the idle termination circuit at normally closed contacts 311. Operation of switching relay 240 also closes contacts 242 in preparation for subsequent closure of contacts 251 when conversation is timed out.

Operation of relay 240 also energizes lamp L31 over a circuit extending from ground through lamp L31, operated contacts 248 and normally closed contacts 315 to battery on lead MSR.

Operation of relay 240 also prepares a circuit for energizing the lower winding of relay 310 from ground through normally closed contacts 223 and 232, operated contacts 245*a*, resistor R23, and the lower winding of relay 310 to battery. Relay 310 does not operate until battery is reversed in its upper winding when the called party answers. At that time, operation of relay 310 opens the line termination across conductors T and R at contacts 311 and connects battery, through lamp L11 and operated contacts 312, to lead M for answer supervision purposes. Operation of relay 310 also, at contacts 311, transfers direct battery for lamp L31 to resistance battery by way of resistor R12 and operated contacts 314 and 248 so that said lamp L31 is dimly lighted to indicate that the called party has answered.

At the completion of the conversation, relay 120 is restored by the removal of ground from the lead E, to also restore relay 240 and to open the holding loop, at operated contacts 123, to restore the incoming switching equipment. Restoration of relay 240 also opens the holding ground at contacts 246, to free this equipment for subsequent calls.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a trunk circuit a pair of line conductors, a pair of repeat coils terminating said line conductors, a calling line, a called line, means including an impulse transmitter for extending a connection from said calling line to said called line through said line conductors in said trunk circuit, a relay, said relay having contacts operable to short circuit said coils, means effective during operation of said impulse transmitter for controlling said relay contacts to short circuit said windings during the impulsing period, means responsive to the answering of the extended connection for instituting timing of the extended connection, and means responsive to a predetermined time of duration of said extended connection for again controlling said relay contacts to again short circuit said coils in order to prevent further conversation over said conductors.

2. The circuit of claim 1 provided with a second relay, a source of warning tone, and means utilizing said second relay for connecting said source of warning tone to said connection prior to said preventing of further conversation.

3. A telephone system comprising first and second lines, a trunk circuit, means for enabling the seizure of said trunk from one to the other of said lines, impulse transmitting means associated with each of said lines, said trunk comprising a calling bridge relay, means responsive to the seizure of said trunk on an outging call from said first line for operating said calling bridge relay, a first slow-to-release relay, means responsive to the operation of said calling bridge relay for operating said slow-to-release relay, means utilizing impulses transmitted from the transmitting means associated with said first line for pulsing said calling bridge relay, said first slow-to-release relay remaining operated during pulsing, a second slow-to-release relay, means responsive to the operation of said first slow-to-release relay and the first release of said calling bridge relay on the receipt of the first transmitted pulse for operating said second slow-to-release relay, a pair of talking conductors, repeating coils connecting to the outgoing end of said conductors, means responsive to the operation of said second slow-to-release relay for short-circuiting said coils during the transmission of pulses in order to provide uniform pulsing characteristics over said talking conductors, means responsive to the completion of the transmission of pulses for releasing said second slow-to-release relay, means responsive to the answering of said called line for instituting timing of the extended connection, and means responsive to a predetermined time of duration of the extended connection for reoperating said second slow-to-release relay whereby said repeating coils are against short-circuited in order to prevent further conversation over the extended connection.

4. The telephone system of claim 3 and another relay, means responsive to another and shorter predetermined time of duration of the extended connection and utilizing said another relay for applying warning tone to said conductors on outgoing calls, and means responsive to the seizure of said trunk on an outgoing call for operating said another relay.

5. The telephone system of claim 4 wherein there is provided means responsive to the seizure of said trunk on an incoming call from said second line for operating said another relay in order to prepare said trunk for extending said incoming call.

References Cited in the file of this patent

UNITED STATES PATENTS

| | | |
|---|---|---|
| 1,443,451 | Anderson | Jan. 30, 1923 |
| 1,897,533 | Richey | Feb. 14, 1933 |
| 2,076,656 | Lomax | Apr. 13, 1937 |
| 2,376,275 | Rhoads | May 15, 1945 |
| 2,558,571 | Lamberty | June 26, 1951 |